May 3, 1927. 1,627,178
F. G. HENRY
CONTROL OF GYROSCOPE ERECTING SYSTEMS
Filed July 27, 1925 2 Sheets-Sheet 1

Inventor
F.G. Henry
by Attorneys
Cooper, Kerr & Dunham

May 3, 1927.　　　　　　　　　　　　　　　　　1,627,178
F. G. HENRY
CONTROL OF GYROSCOPE ERECTING SYSTEMS
Filed July 27, 1925　　　　2 Sheets-Sheet 2
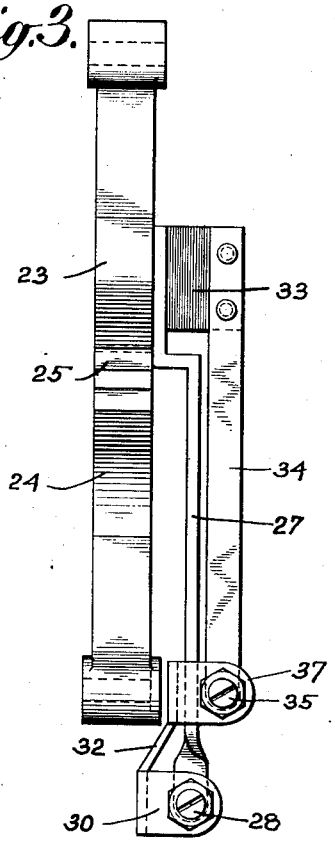
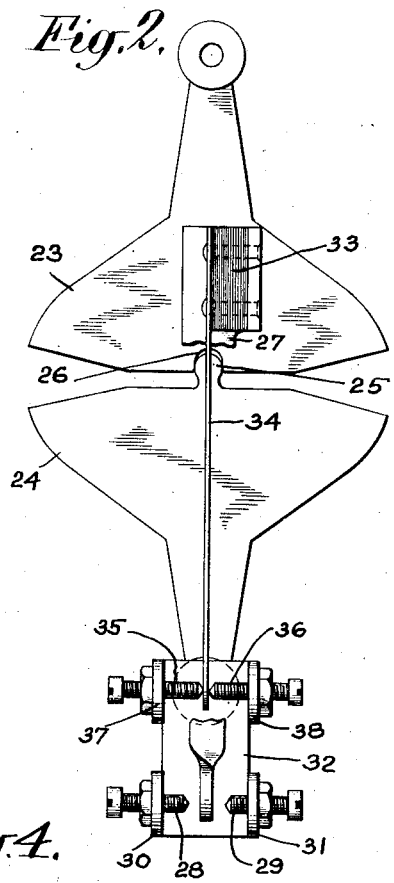
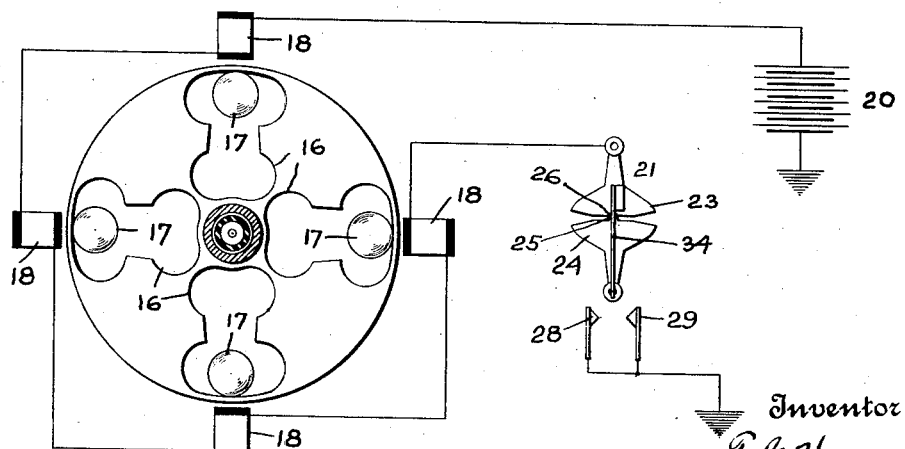
Inventor
F. G. Henry
By his Attorneys
Cooper, Kerr & Dunham Patented May 3, 1927.

1,627,178

UNITED STATES PATENT OFFICE.

FERDINAND GEORGE HENRY, OF NEW YORK, N. Y., ASSIGNOR TO FAIRCHILD AERIAL CAMERA CORPORATION, A CORPORATION OF NEW YORK.

CONTROL OF GYROSCOPE-ERECTING SYSTEMS.

Application filed July 27, 1925. Serial No. 46,371.

In the gyroscope "erecting" system described in the United States patent of J. and J. G. Gray, No. 1,311,768, issued July 29, 1919, the action of the centrifugal devices or elements (usually but not necessarily in the form of balls) revolving around the axis of the gyroscope, in keeping the gyroscope axis stable in position, is apt to be affected by centrifugal force or radial acceleration relative to a center which is not coincident with the axis of the gyroscope; as for example the centrifugal force incident to change of direction of flight of an airplane carrying the gyroscope. The present invention is designed chiefly for the purpose of locking or holding the balls in position, preferably in their extreme outer positions, when an external centrifugal force arises of sufficient magnitude to disturb, or seriously disturb, the stabilizing action of the balls. To this and other ends the invention comprises the novel features, elements, and combinations, hereinafter disclosed.

In carrying out the invention in the preferred manner, as designed for employment with an erected gyroscope used for stabilizing an aerial camera carried by an airplane, I provide around the ball-propelling element of the erecting mechanism a series of electromagnets, and make the balls wholly or partly of magnetic metal, so that when the magnets are energized they will be attracted to and held by the same. The magnet circuit is controlled by a centrifugally actuated switch or contact system, so constructed and arranged that so long as the airplane is pursuing a straight course the circuit will remain open, but when the airplane changes its course at too fast a rate the resulting centrifugal force or transverse acceleration effective on the switch or contact mechanism will close the magnet circuit and thereby cause the magnets to be energized, thus holding the balls in predetermined positions until the turn is completed (or the disturbing acceleration is decreased to a predetermined minimum), whereupon the magnet circuit is opened again, and the balls are thus freed.

The embodiment outlined above is illustrated in the accompanying drawing, in which—

Fig. 2 is a detail front view and Fig. 3 a detail side view of the centrifugal switch.

Fig. 4 is a diagram showing the wiring of the centrifugal control system.

Figure 1:
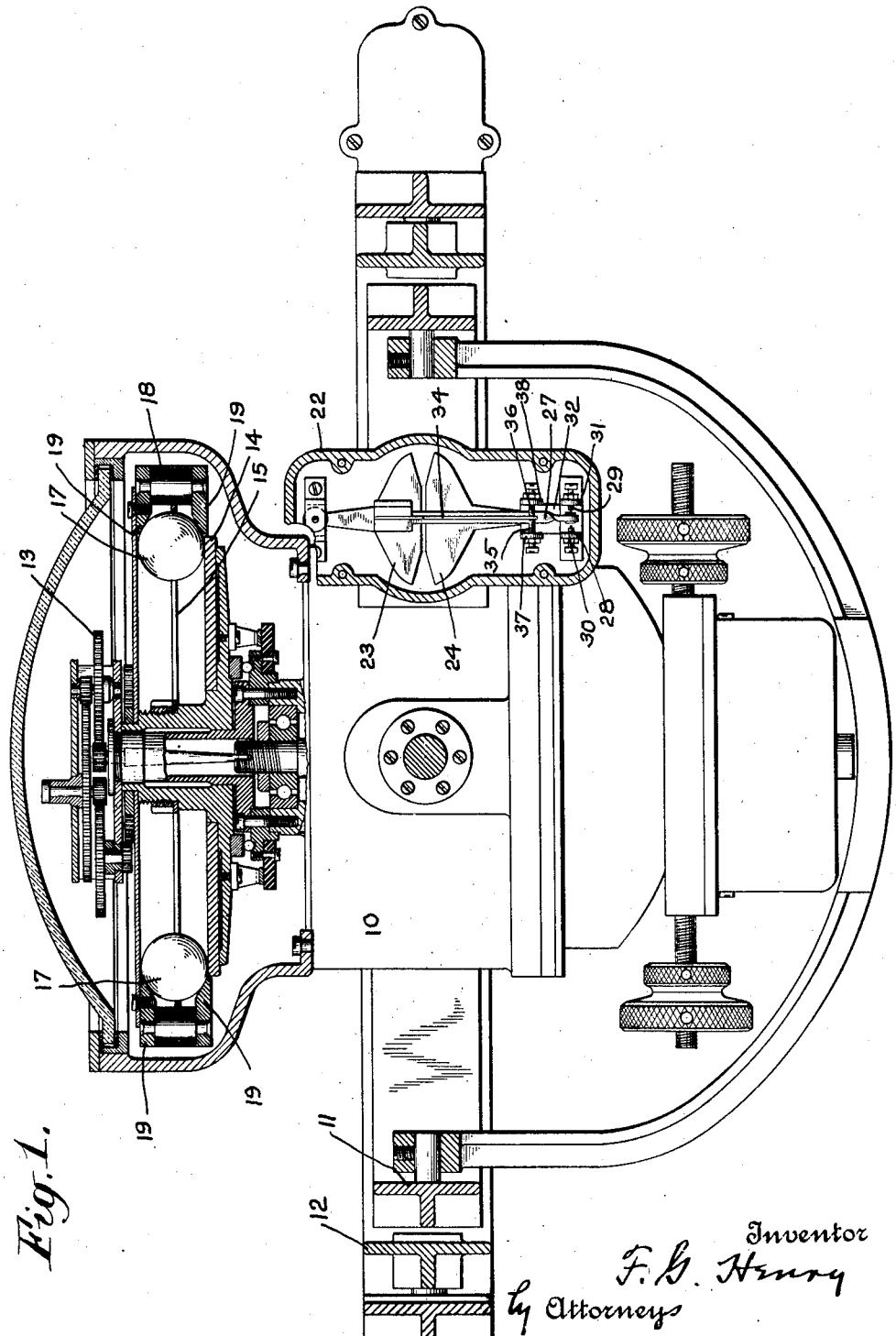
Fig. 1 is a side view, partly in section, showing a gyroscope equipped with the present invention.

The gyroscope 10, carried by gimbal rings 11, 12, is provided with erecting mechanism which is rotated by the gyroscope itself and in the same direction but at lower rate of speed, through the agency of the gearing 13, the gyroscope rotor itself being driven by any convenient and suitable means, not shown. The erecting mechanism comprises a circular table 14 and a disk 15 having apertures 16, Fig. 2, in which the magnetic balls 17 are confined. These apertures not only cause the balls to revolve about the gyroscope axis with the table 14 but also limit the circumferential movement of the balls relative to each other and thus keep them spaced substantially equi-angularly. Carried by the revolving erector mechanism at the outer extremities of the apertures 16 are four electro-magnets 18, having pole-pieces 19 extending radially inward above and below the disk 15. It will be readily seen that when the magnets are energized the balls are held in their outer positions in the disk 15. The magnets are connected in series with each other and with a source of current 20, Fig. 4, through a centrifugally actuated contact mechanism 21, connections between the first magnet and the source and between the last magnet and the switch being by slip rings and brushes or other suitable means, not shown.

The contact mechanism just mentioned is housed in a casing 22, carried by the gyroscope, and comprises a pair of weights 23, 24, mounted on upper and lower pivots and pivotally connected or "geared" together by means of a rounded lug 25 on the lower weight cooperating with a recess 26 in the upper weight to permit free simultaneous rocking motion of the weights on their pivots. The upper weight carries a contact finger 27 extending downwardly past the lower pivot and playing between two opposed contact screws 28, 29, carried in arms 30, 31 on the bracket 32 which is fixed on a wall of the metallic housing 22 in electrical connection therewith. The upper weight also carries an insulating block 33 in which is fixed a blade spring 34, extending downwardly and having its lower end lightly clamped between two opposed screws 35, 36, in arms 37, 38, on the bracket 32.

As indicated in Fig. 4 the contact finger 27 is connected through the magnets in series to one side of the current source 20, the other side of which is grounded to the housing 22. Contacts 28, 29 are also grounded. Assume now that with the erector balls 17 in their outer positions, as in Fig. 4, the gyroscope is subjected to an acceleration directed toward the left of Fig. 1. If this disturbing force is of sufficient magnitude to overcome the tension of spring 34 the weights will swing rightwardly on their pivots, bringing finger 27 against contact 29 and closing the magnet circuit. The magnets then hold the balls firmly, making it impossible for any of them, revolving slowly around the axis of the gyroscope, to be thrown toward the gyroscope axis by the force that actuated the weights. The forces which tend to cause precession are therefore kept in balance. Should, however, the ball at the left in Figs. 1 and 4 happen to be in an inner position, so far from its magnet that the latter cannot overcome the disturbing force, the revolving erector mechanism will, in a few seconds at most, carry the ball to the other side of the gyroscope axis, where the disturbing force is aiding instead of opposing the field of the magnet. The ball is then held like the others. In one gyroscope system for which my invention has been designed the erector mechanism makes eight revolutions per minute, so that a ball will move from one point in its orbit to a diametrically opposite point in four seconds or less.

The operation is the same when the disturbing force is directed leftwardly, except that the finger 27 then engages contact 28 instead of 29.

As soon as the centrifugal disturbing force or other transverse acceleration falls below a magnitude sufficient to actuate the centrifugal switch the magnet circuit is broken and the erector is then free to resume its normal operation. It will be noted that the minimum magnitude (of the disturbing acceleration) at which the switch operates to close the circuit is determined, other conditions being the same, by the design of the spring 34.

It is to be understood that the invention is not limited to the specific embodiment herein illustrated and described but can be embodied in other forms without departure from its spirit.

I claim—

1. The combination with a gyroscope, and an erecting system therefor including a plurality of radially movable balls revolving around the axis of the gyroscope, of means for holding the balls against radial movement when the system is subjected to acceleration at an angle to the gyroscopic axis.

2. The combination with a gyroscope, and an erecting system therefor including a plurality of radially movable balls revolving around the axis of the gyroscope, of automatic means responsive to acceleration at an angle to the gyroscope axis to hold the balls against radial movement.

3. The combination with a gyroscope, and an erecting system therefor including a plurality of radially movable balls revolving around the axis of the gyroscope, of electromagnetic means for holding the balls against radial movement, a normally open energizing circuit for said means, and automatic circuit-closing means for said circuit responsive to acceleration at an angle to the axis of the gyroscope.

4. The combination with a gyroscope, and an erecting system therefor including a plurality of radially movable balls revolving around the axis of the gyroscope, of automatic means responsive to acceleration at an angle to the gyroscope axis to hold the balls radially stationary at their outermost positions.

5. The combination with a gyroscope, and an erecting system therefor including a plurality of radially movable balls revolving around the axis of the gyroscope, of a plurality of electromagnets arranged symmetrically around the gyroscope axis to hold the balls against radial movement, an energizing circuit for the magnets, and controlling means for said circuit responsive to acceleration at an angle to the gyroscope axis to cause energization of the magnets.

6. The combination with a gyroscope, and an erecting system therefor including a plurality of radially movable balls revolving around the axis of the gyroscope, of a plurality of electromagnets arranged symmetrically around the axis of the gyroscope, to hold the balls against radial movement, a normally open energizing circuit for the magnets, and means for controlling said circuit, responsive to acceleration of predetermined magnitude at an angle to the gyroscope axis, comprising an upper weight mounted on an upper pivot, a lower weight geared to the upper weight and mounted on a lower pivot, yielding means for holding the weights in predetermined relative position, a contact in said energizing circuit, and a movable contact in said circuit, carried by the weights to cooperate with the first named contact.

7. The combination with a gyroscope, and an erecting system therefor including a plurality of radially movable balls revolving around the axis of the gyroscope, of a plurality of electromagnets arranged symmetrically around the axis of the gyroscope, to hold the balls against radial movement, a normally open energizing circuit for the magnets, and means for controlling said circuit, responsive to acceleration of predetermined magnitude at an angle to the gyroscope axis, comprising an upper weight pivoted on an upper pivot, a lower weight geared to the upper weight and pivoted on a lower pivot, a spring connected with the upper weight to hold both yieldingly against pivotal movement in either direction, a pair of fixed contacts in parallel to each other in said energizing circuit, and a contact in said circuit, carried by the upper weight for engagement with one or the other of said fixed contacts according to the direction of swing of the said upper weight.

8. The combination with a gyroscope, and an erecting system therefor including a disk adapted to rotate about the axis of the gyroscope and provided with a plurality of radial slots spaced equiangularly, and a plurality of balls of magnetic metal arranged in the said slots whereby to be carried around the gyroscope axis by the rotating disk; of a plurality of electromagnets, arranged adjacent to the slots in the disk to hold the balls magnetically at predetermined distances from the axis of the gyroscope, an energizing circuit for said magnets, and means for controlling the circuit, comprising circuit closing and opening mechanism dependent for operation upon transverse acceleration of predetermined magnitude.

9. In an erecting system for gyroscopes, in combination, a rotary disk having radial slots spaced equiangularly, magnetic balls in said slots and adapted for radial movement therein as the disk rotates, electromagnets arranged at the outer ends of the slots to hold the balls in their outermost positions, a normally open energizing circuit for the magnets, and means for closing said circuit, responsive to acceleration of predetermined magnitude transverse to the axis of rotation of the disk.

10. In an erecting system for gyroscopes, a plurality of magnetic balls adapted to revolve around the gyroscope axis, a plurality of electromagnets adapted to hold the balls at predetermined positions relative to said axis, a normally open energizing circuit for the magnets, and means for closing said circuit, comprising a pivoted body adapted to be swung by acceleration transverse to the axis of revolution of the balls, and yielding means associated with the pivoted body to prevent swinging movement thereof except when the said acceleration is of predetermined magnitude.

11. In a gyroscope erecting system of the kind described, a plurality of ball-holding electromagnets, an energizing circuit therefor; and controlling means for said circuit, comprising a pair of pendulously mounted bodies arranged one above the other and connected for simultaneous swinging movement under the influence of transverse acceleration, yielding means arranged to oppose swinging of said bodies, and circuit closing and opening contacts arranged in said circuit and actuated by said bodies.

12. The combination comprising a gyroscope and an erecting system, said erecting system including a plurality of magnetic balls, a disk having apertures for confining said balls, a table for supporting said balls, means to support said table on the gyroscope body, means to rotate the disk, balls and table, an electromagnet for each of said balls and mounted close to the outer edge of said table, a normally open energizing circuit for the magnets, and controlling means for said circuit, comprising a pair of pendulously mounted bodies arranged one above the other and connected for simultaneous swinging movement under the influence of transverse acceleration, yielding means arranged to oppose swinging of said bodies, and circuit closing and opening contacts in said circuit actuated by said bodies.

13. The combination comprising a gyroscope and an erecting system, said erecting system including a rotary disk having radial slots spaced equiangularly, magnetic balls confined by said slots and adapted for radial movement therein as the disk rotates, means controlled by said gyroscope for rotating said disk, an electromagnet for each of said balls and mounted close to the outer edges of said slots, a normally open energizing circuit for the magnets, and means for closing said circuit and responsive to forces acting transverse to the axis of rotation of the gyroscope, said means comprising a pair of pendulous members resiliently held in normal position against all transverse forces below a predetermined magnitude, and contacts in said circuit, one of which is controlled by said pendulous members, arranged to close said circuit when said pendulous members are displaced from their normal positions by transverse forces.

14. The combination comprising a gyroscope and an erecting system, said erecting system including a plurality of magnetic balls, a disk having apertures for confining said balls, a table carried by the gyroscope body and supporting said balls, means operated by the gyroscope for rotating the disk, balls and table, electromagnets for holding said balls close to the outer ends of said apertures when said electromagnets are energized, an energizing circuit for said electromagnets, pivotally mounted members resiliently held in normal position, contacts for closing said circuit, one of said contacts being controlled by one of said pivotally mounted members and being adapted to close said circuit when said pivotally mounted members are displaced a predetermined distance, and means for permitting adjustment of the normal mid-position of said pivotally mounted members.

In testimony whereof I hereto affix my signature.

FERDINAND GEORGE HENRY.